United States Patent [19]

Matsuura et al.

[11] Patent Number: 4,625,287

[45] Date of Patent: Nov. 25, 1986

[54] MONOSYLLABLE RECOGNITION APPARATUS

[75] Inventors: Hiroshi Matsuura, Odawara; Tsuneo Nitta, Yokohama, both of Japan

[73] Assignee: Tokyo Shibaura Denki Kabushiki Kaisha, Kawasaki, Japan

[21] Appl. No.: 541,029

[22] Filed: Oct. 12, 1983

[30] Foreign Application Priority Data

Oct. 19, 1982 [JP] Japan ................................. 57-183411

[51] Int. Cl.[4] .............................................. G10L 5/00
[52] U.S. Cl. ................................. 364/513.5; 381/41; 381/43
[58] Field of Search ..................................... 381/29–53; 364/513.5, 513

[56] References Cited

FOREIGN PATENT DOCUMENTS 0085543 1/1983 European Pat. Off. ............. 381/43

OTHER PUBLICATIONS

Nakagawa et al., A Real Time Spoken Word Recognition System With Various Learning Capabilities of Speaker Differences, pp. 63–71, System·Computers·Controls, vol. 9, No. 3, 1978.
IEEE Transactions on Electronic Computers, vol. EC-12, No. 5, (Dec. 1963), T. Sakai et al, "The Automatic Speech Recognition System for Conversational Sound," pp. 835–846.
ICASSP 82, IEEE International Conference on Acoustics, Speech & Signal Processing, vol. 2 (May 3–5, 1982), A. Komatsu et al, "Phoneme Recognition in Continuous Speech," pp. 883–888.
Journal of the Acoustical Society of Japan, vol. 39, No. 2 (Feb. 1983), Y. Nitadori et al, "A Real-Time Recognition System," pp. 75–81.

Primary Examiner—Gareth D. Shaw
Assistant Examiner—John J. Salotto
Attorney, Agent, or Firm—Oblon, Fisher, Spivak, McClelland & Maier

[57] ABSTRACT

A monosyllabic recognition apparatus is disclosed which includes a first memory which stores reference vowel patterns respectively representing vowel categories of known reference monosyllables of a preselected language, which are classified in accordance with the type of vowel characteristics of the language, the vowel categories independently including categories corresponding to a contracted sound and a syllabic nasal sound in addition to categories of basic vowels; a second memory which stores reference consonant patterns respectively representing consonant categories of the language, which are classified in accordance with the type of consonant characteristics of the language. A characteristic extracting section generates the acoustic parameter data of the input speech, which is divided by a segment processing section into monosyllabic acoustic parameter components. A speech recognition processing section compares each of the monosyllabic acoustic parameter components with the reference vowel and consonant patterns and performs monosyllable recognition in accordance with the determination of the vowel and consonant categories of the reference patterns which maximally resemble the monosyllabic acoustic parameter components.

12 Claims, 4 Drawing Figures

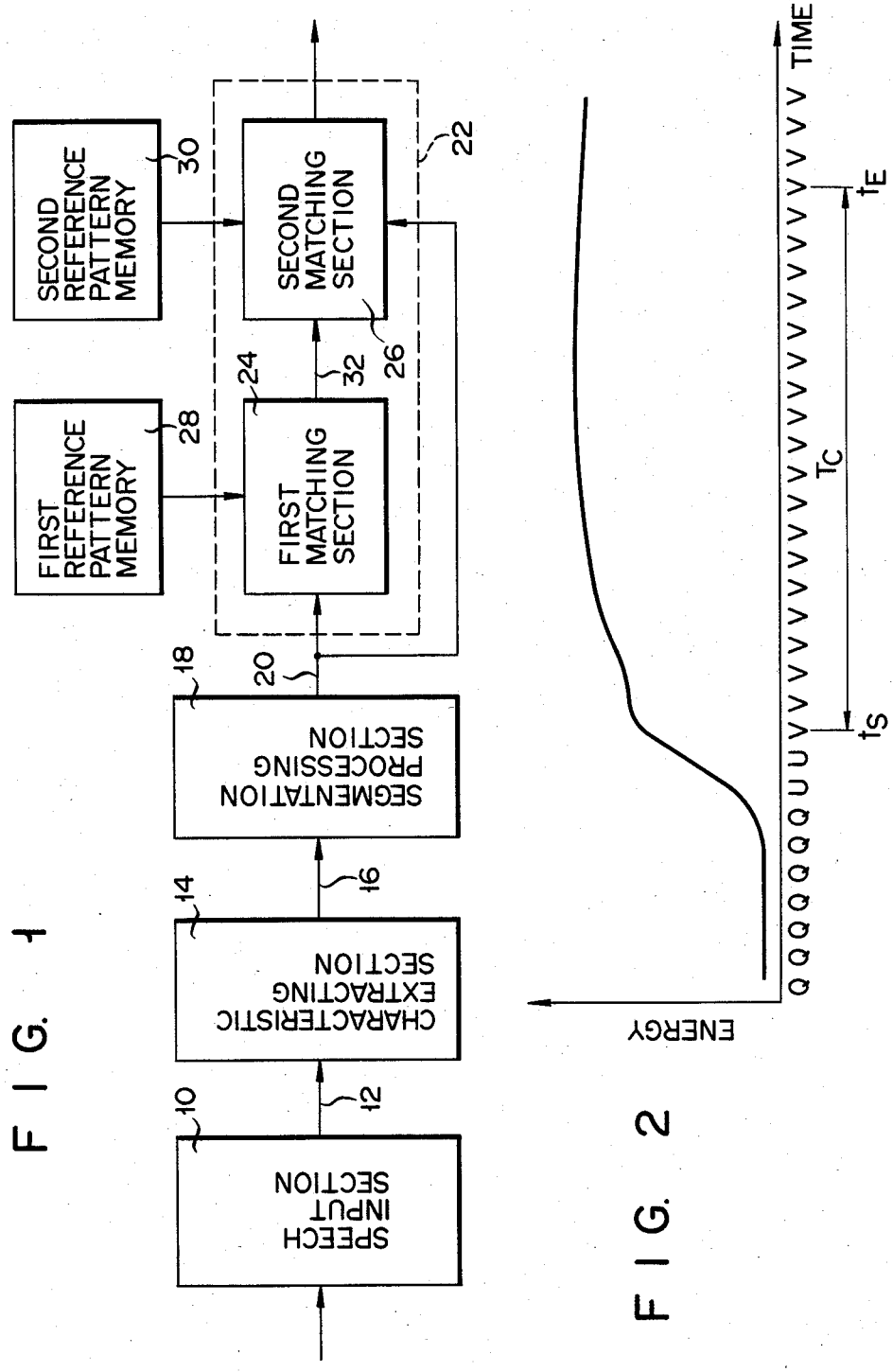

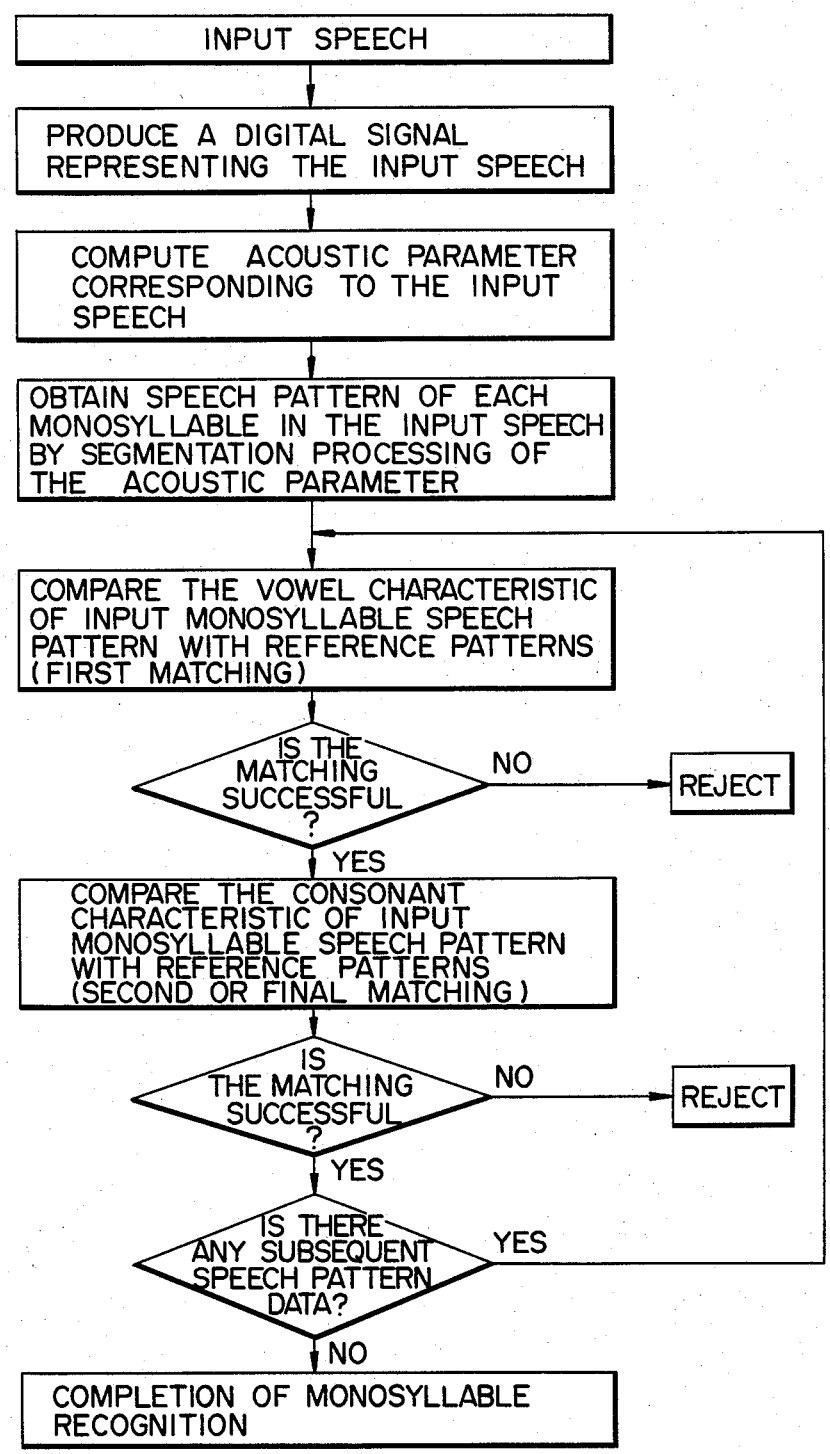

MONOSYLLABLE RECOGNITION APPARATUS

BACKGROUND OF THE INVENTION

The present invention relates in general to a speech recognition apparatus and, more particularly, to a monosyllable recognition (identification) apparatus which divides input speech into monosyllables and recognizes each individual monosyllable.

Information input systems for directly recognizing input speech information generated by a human being and for producing corresponding electrical data have become increasingly important. Of such information input systems, a monosyllable recognition system is known which computes acoustic parameter data of input speech, performs segmentation of the acoustic parameter thus obtained into monosyllables, and identifies or recognizes each monosyllable.

In such a conventional monosyllable recognition system, however, the proportion of input speech which can be correctly recognized, that is, the recognition ratio, is not satisfactory. One of the reasons for this is that even if the number of languages which can be input is limited to one, for example, Japanese, the number of monosyllables in the Japanese language well exceeds one hundred. When the same speech pattern recognition computer operation is repeatedly performed for such a large number of monosyllables, this merely increases the amount of data to be processed, and provides no improvement in the recognition ratio.

SUMMARY OF THE INVENTION

It is an object of the present invention to provide a new and improved monosyllable recognition apparatus which can recognize individual monosyllables of input speech with high precision.

A monosyllable recognition apparatus according to the present invention recognizes, in units of monosyllables, speech which is generated in accordance with a predetermined language system and is input thereto. A first memory means stores reference vowel patterns which respectively represent first categories of a first number, which are, in turn, obtained by classifying a group of known reference monosyllables in accordance with types of vowel features or characteristics (phonemes) of the language in question. These first categories include separate categories corresponding to contracted sounds or syllabic nasal sounds in addition to the categories corresponding to basic vowels. A second memory means stores reference consonant patterns which respectively represent second categories of a second number, which are, in turn, obtained by classifying a group of known reference monosyllables in accordance with types of consonant characteristics (phonemes) of the language in question. A first processing means converts input speech into electrical signals and generates acoustic parameter data of the input speech in accordance with the electrical signals. A second processing means is connected to the first processing means so as to perform segmentation of the acoustic parameter data into monosyllabic acoustic parameter components corresponding to the monosyllables of the input speech. A third processing means is connected to the second processing means and to the first and second memory means to match each of the monosyllabic acoustic parameter components of the input speech with the reference vowel and consonant patterns. The third processing means thus performs monosyllable recognition upon determining which first category of the reference vowel patterns and which second category of the reference consonant patterns maximally resemble the input monosyllabic acoustic parameter component.

BRIEF DESCRIPTION OF THE DRAWINGS

The present invention is best understood by reference to the accompanying drawings, in which:

FIG. 1 is a block diagram illustrating a monosyllable recognition apparatus according to one embodiment of the present invention;

FIG. 2 is a graph showing the variation in power over time of an input speech pattern having a long vowel;

FIG. 3 is a flow chart diagram indicating the principal operations of the monosyllable recognition apparatus.

DETAILED DESCRIPTION OF THE PREFERRED EMBODIMENTS

Figure 4:
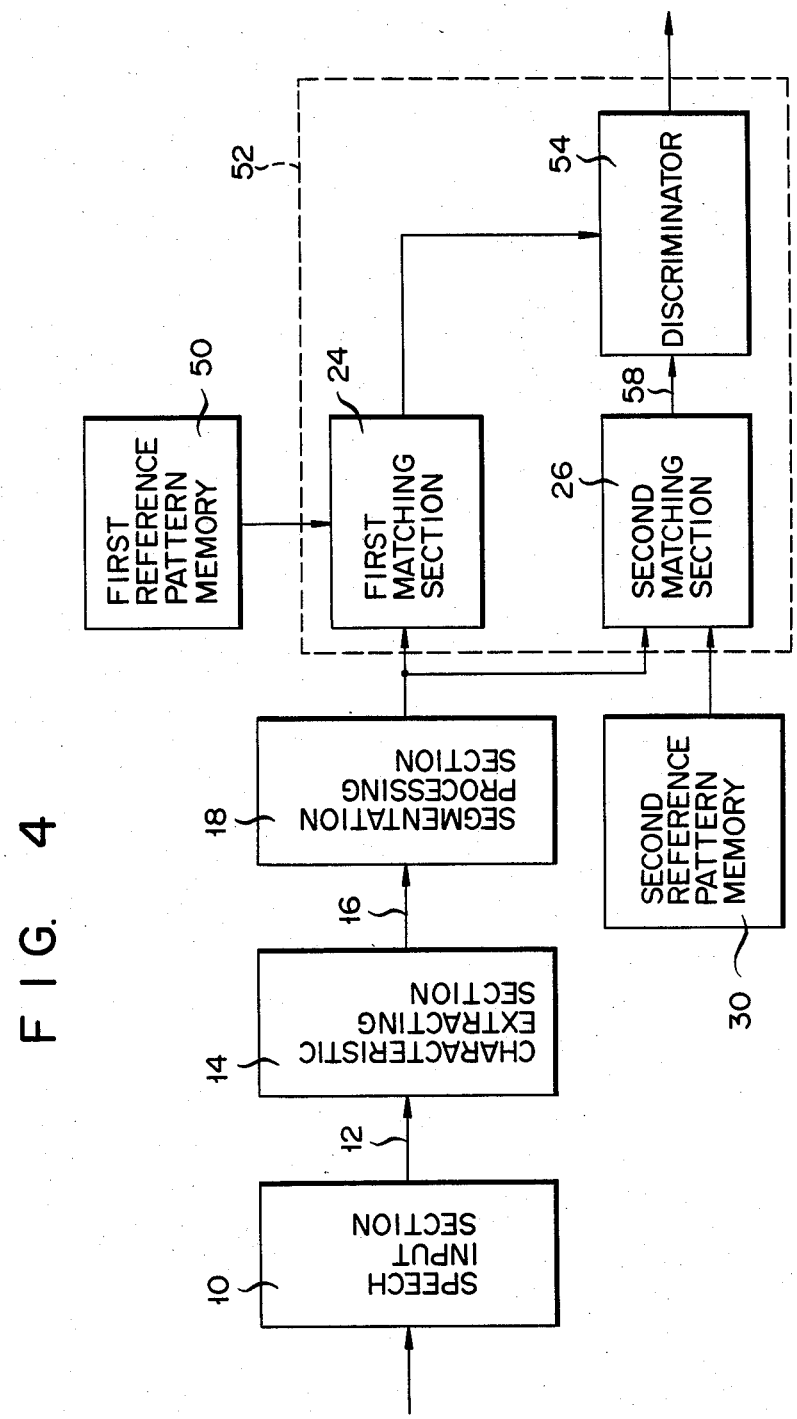
FIG. 4 is a block diagram showing a monosyllable recognition apparatus according to another embodiment of the present invention.

In a monosyllable recognition apparatus according to an embodiment of the present invention, as shown in FIG. 1, a speech input section 10 includes a known microphone, an amplifier, an A/D converter (not shown) and the like. Input speech supplied to the speech input section 10 by a speaker is converted into analog speech signals through the microphone, which are amplified by the amplifier and are converted into digital speech signals 12 by the A/D converter. The digital speech signals 12 are supplied to a characteristic extracting section 14. The characteristic extracting section 14 is comprised of, for example, a group of 16-channel band-pass filters and serves to obtain acoustic parameter data 16 representing a characteristic of the input speech such as a frequency change or a time change in accordance with the signals 12. The characteristic extracting section 14 obtains the power of the input speech over the entire frequency band and the respective power of the input speech in a plurality of divided bands such as a low frequency band, a high frequency band, an intermediate high frequency band, and an intermediate low frequency band. The characteristic extracting section 14 produces the acoustic parameter data 16 including the obtained power data. The acoustic parameter data 16 is supplied to a segmentation processing section 18 of the next stage.

The segmentation processing section 18 performs segmentation of the acoustic parameter data 16; it obtains segment speech patterns (i.e., speech patterns divided into monosyllables) having two directivities in frequency and time and extracts the characteristic parameter of every monosyllable of the input speech. The characteristic parameter of a monosyllable, in this embodiment, is a 256-dimensional (16 dimensions along the axis of frequency and 16 dimensions along the axis of time) speech pattern data 20 which is obtained by segmenting the output data from the band-pass filters of the section 14 divided in 16 channels along the axis of frequency and resampling the segmented acoustic parameter pattern at 16 points at equal intervals along the axis of time. The speech pattern data 20 is supplied to a speech recognition processing section 22.

The speech recognition processing section 22 includes first and second pattern matching sections 24 and 26, which are respectively connected to first and second reference pattern memories 28 and 30. The first pattern matching section 24 serves to recognize a vowel included in the speech pattern data 20 and roughly classifies (first speech pattern matching) the input speech according to the recognized vowel characteristic included therein. The first matching section 24 matches the reference vowel patterns prestored in the first memory (or first reference pattern memory) 28 with the be processed by the apparatus. In the case of Japanese, the reference monosyllables of the language consist of a first group (67) of monosyllables including the basic vowels A, I, U, E and O, a second group (33) of monosyllables consisting of contracted sounds, and a third group (1) comprising a syllabic nasal sound. When the total of 101 reference monosyllables are registered in the first memory 28, they are categorized into a total of 17 categories as shown in Table 2.

TABLE 1

| Consonant category | Vowel category | | | | | | | | Syllabic nasal sound |
|---|---|---|---|---|---|---|---|---|---|
| | Basic vowel group | | | | | Contracted sound group | | | |
| | A | I | U | E | O | — | — | — | N |
| — | — | — | — | — | — | — | — | — | N |
| K | KA | KI | KU | KE | KO | KYA | KYU | KYO | |
| S | SA | SI | SU | SE | SO | SHA | SHU | SHO | |
| T | TA | TI | TU | TE | TO | CHA | CHU | CHO | |
| N | NA | NI | NU | NE | NO | NYA | NYU | NYO | |
| H | HA | HI | HU | HE | HO | HYA | HYU | HYO | |
| M | MA | MI | MU | ME | MO | MYA | MYU | MYO | |
| Y | YA | — | YU | — | YO | — | — | — | |
| R | RA | RI | RU | RE | RO | RYA | RYU | RYO | |
| W | WA | — | — | — | — | — | — | — | |
| G | GA | GI | GU | GE | GO | GYA | GYU | GYO | |
| Z | ZA | ZI | ZU | ZE | ZO | ZYA | ZYU | ZYO | |
| D | DA | — | — | DE | DO | — | — | — | |
| B | BA | BI | BU | BE | BO | BYA | BYU | BYO | |
| P | PA | PI | PU | PE | PO | PYA | PYU | PYO | |

TABLE 2

| | | Vowel matching category prestored in first memory | | | | | | | |
|---|---|---|---|---|---|---|---|---|---|
| | | (1) CV | | | | | (2) CYV | | (3) N |
| | | 1 | 2 | 3 | 4 | 5 | 6 | 7 | 8 | 9 |
| Consonant matching category prestored in second memory | 1 A | I | U | E | O | YA | YU | YO | N |
| | 2 KA | KI | KU | KE | KO | KYA | KYU | KYO | |
| | 3 SA | SI | SU | SE | SO | SHA | SHU | SHO | |
| | 4 TA | TI | TU | TE | TO | CHA | CHU | CHO | |
| | 5 NA | NI | NU | NE | NO | NYA | NYU | NYO | |
| | 6 HA | HI | HU | HE | HO | HYA | HYU | HYO | |
| | 7 MA | MI | MU | ME | MO | MYA | MYU | MYO | |
| | 8 RA | RI | RU | RE | RO | RYA | RYU | RYO | |
| | 9 WA | — | — | — | — | — | — | — | |
| | 10 GA | GI | GU | GE | GO | GYA | GYU | GYO | |
| | 11 ZA | ZI | ZU | ZE | ZO | ZYA | ZYU | ZYO | |
| | 12 DA | DI | DU | DE | DO | DYA | DYU | DYO | |
| | 13 BA | BI | BU | BE | BO | BYA | BYU | BYO | |
| | 14 PA | PI | PU | PE | PO | PYA | PYU | PYO | |

| | | (4) CVN | | | | | (5) CYVN | | |
|---|---|---|---|---|---|---|---|---|---|
| | | 10 | 11 | 12 | 13 | 14 | 15 | 16 | 17 |
| Consonant matching category prestored in second memory | 1 AN | IN | UN | EN | ON | YAN | YUN | YON |
| | 2 KAN | KIN | KUN | KEN | KON | KYAN | KYUN | KYON |
| | 3 SAN | SIN | SUN | SEN | SON | SHAN | SHUN | SHON |
| | 4 TAN | TIN | TUN | TEN | TON | CHAN | CHUN | CHON |
| | 5 NAN | NIN | NUN | NEN | NON | NYAN | NYUN | NYON |
| | 6 HAN | HIN | HUN | HEN | HON | HYAN | HYUN | HYON |
| | 7 MAN | MIN | MUN | MEN | MON | MYAN | MYUN | MYON |
| | 8 RAN | RIN | RUN | REN | RON | RYAN | RYUN | RYON |
| | 9 WAN | — | — | — | — | — | — | — |
| | 10 GAN | GIN | GUN | GEN | GON | GYAN | GYUN | GYON |
| | 11 ZAN | ZIN | ZUN | ZEN | ZON | ZYAN | ZYUN | ZYON |
| | 12 DAN | DIN | DUN | DEN | DON | DYAN | DYUN | DYON |
| | 13 BAN | BIN | BUN | BEN | BON | BYAN | BYUN | BYON |
| | 14 PAN | PIN | PUN | PEN | PON | PYAN | PYUN | PYON | input speech pattern data 20 in accordance with a predetermined recognition method such as a complex similarity method or a recognition method which uses a two-dimensional recognition function computed based on a pattern average value and a covariance. The first matching section 24 thus matches the input speech pattern data 20 in accordance with the recognized vowel characteristic. In this case, the reference vowels registered in the first memory 28 are categorized in accordance with the type of vowels included in a language to Categorization of the basic vowels in accordance with the vowel characteristics will now be described with reference to Table 2. When a vowel phoneme is represented by V, a consonant phoneme is represented by C, a contracted sound phoneme is represented by Y, and the syllabic nasal sound phoneme is represented by N, all the monosyllables of the Japanese language can be categorized into:

(1) CV: A set of general monosyllables each consisting of a combination of a consonant and a vowel, and which is obtained by excluding "YA", "YU" and "YO" from the basic vowels in Table 1. The set includes five categories corresponding to the vowels "A", "I", "U", "E", and "O".

(2) CYV: A set of contracted sounds each consisting of a combination of a consonant, a contracted sound and a vowel, and which is obtained by adding "YA", "YU" and "YO" to the contracted sound group shown in Table 1. The set includes three categories corresponding to the vowels "A", "U" and "O".

(3) N: A set consisting of the single syllabic nasal sound, and which has only one category.

(4) CVN: A combination set of the sounds of items (1) and (3) above, each member consisting of a combination of a consonant, a vowel and the syllabic nasal sound. The set includes five categories corresponding to the vowels "A", "I", "U", "E" and "O".

(5) CYVN: A combination set of the sounds of items (2) and (3) above, each member consisting of a combination of a consonant, a contracted sound, a vowel, and the syllabic nasal sound. The set includes three categories corresponding to the vowels "A", "U" and "O".

These categorized sounds are registered in the first memory 28. When the input speech pattern data 20 is supplied to the first matching section 24, the first matching section 24 performs the above-mentioned matching operation in order to determine to which one of the 17 monosyllable categories each monosyllable of the input speech pattern belongs. When the first pattern matching at the first matching section 24 is satisfactorily completed, the first stage (first speech pattern matching) of the monosyllable recognition of input speech is completed. Then, the section 24 generates category property data 32 which represents the category of the input monosyllable.

When the category property data 32 is supplied to the second matching section (or final monosyllable identification section) 26, the segmented speech pattern data 20 is also supplied to the final monosyllable identification section 26. For the input monosyllable which is supplied to the final monosyllable identification section 26, identification of which category of the 17 categories it belongs to has been made. Then, the final monosyllable identification section 26 serves to recognize the consonant portion of the input monosyllable. In this case, the monosyllable identification section or second matching section 26 resamples the consonant phoneme portion (partially including the intermediate pattern between the consonant phoneme and the subsequent vowel phoneme) of the syllable pattern along the axis of time. Thereafter, the section 26 sequentially compares the 14 reference consonant categories ("K", "S", "T", ..., "D", "B", and "P") which are registered along the column direction of Table 2 in the second reference pattern memory 30 with the consonant phoneme portion of the input monosyllable pattern. When matching with the consonant category is satisfactorily completed, the input monosyllable which has already been categorized in accordance with the vowel characteristic is then categorized in accordance with the consonant characteristic, thereby completing recognition of the monosyllable. For example, when the input speech pattern data 20 is categorized as belonging to the third vowel category "U" by the section 24, the consonant category of the data 20 is not yet identified among "U", "KU", "SU", ..., "BU", and "PU". This is the first step in monosyllable recognition. Subsequently, when the consonant recognition of the input monosyllable at the section 26 is completed and the monosyllable is identified as belonging to the "M" category, the input monosyllable is identified as "MU" which has a consonant "M" among the plurality (12) of monosyllables of the third vowel category. This stage is the second or final step in monosyllable recognition.

The operation mode of the monosyllable recognition apparatus of the embodiment having the configuration as described above will now be described with reference to the flow chart shown in FIG. 3. A case will be considered wherein a speaker smoothly produces a Japanese word "onkyō" corresponding to the English word "sound". When this word is supplied to the speech input section 10, the input section 10 produces corresponding digital speech signals 12. In accordance with the signals 12, the characteristic extracting section 14 computes the corresponding acoustic parameter data 16 and supplies it to the segmentation processing section 18. The acoustic parameter data 16 is subjected to segmentation at the section 18 so as to obtain speech patterns of the respective monosyllables (i.e., two speech patterns of "on" and "kyō") of the input speech. This monosyllable pattern data is supplied to the speech recognition processing section 22 to start monosyllable recognition processing.

The first matching section 24 included in the section 22 extracts the vowel characteristic (phoneme) included in the first speech pattern data corresponding to "on". Then, the section 24 sequentially compares the vowel characteristic with the reference vowel patterns (of 17 categories) stored in the first reference pattern memory 28. In this comparing or matching step, a similarity calculation technique is utilized. More specifically, the reference vowel patterns registered in the first reference pattern memory 28 are represented as $\{\phi_m^{(l)}\}$ (m=1, 2, ..., M$^{(l)}$), i.e., M$^{(l)}$ number of standard pattern groups perpendicular to one another for every category l (l=1, 2, ..., L) where L is the number of categories. Therefore, the section 24 sequentially performs a complex similarity calculation between the input speech pattern and the reference patterns registered in the memory 28 according to a relation:

$$S^{(l)}[f] = \sum_{m=1}^{M^{(l)}} a_m^{(l)} \cdot (f \cdot \phi_m^{(l)})^2 / \|f\|^2$$

where
  $a_m$: the weight coefficient previously selected for m-th axis of the category l
  f: the vector of the input speech pattern
  m: the number of the axis The section 24 compares the calculation results and obtains the first matching result. The algorithm for performing matching in accordance with such a complex similarity calculation method may be one of various known algorithms.

When first pattern matching by the section 24 is satisfactorily completed, the first monosyllable pattern is identified as belonging to the 14th vowel category (the category having a vowel "O" of CVN type) shown in the row direction of Table 2. The 14th vowel category property data is thus supplied from the first matching section 24 to the second matching section (second or final monosyllable identification section) 26. Subsequently, the first monosyllable pattern data is subjected to second pattern matching at the second matching section 26 based on the consonant characteristic (phoneme). The section 26 sequentially compares the input speech pattern data with the reference consonant patterns of the 14 categories prestored in the second reference pattern memory 30. When the second pattern matching is satisfactorily completed, the first monosyllable pattern is identified as belonging to the first consonant category (the set which involves no consonant) among the 14 categories shown in the column direction of Table 2. This is because the monosyllable "on" includes no consonant sound. As a result, since the first monosyllable pattern satisfies both the 14th vowel category and the first consonant category in the matrix shown in Table 2, it is finally recognized as "on".

Monosyllable recognition of the second monosyllable pattern data corresponding to "kyō" is then performed. This pattern involves a contracted sound syllable "kyo" and a following elongated vowel sound "ō". In such a case, in order to prevent a decrease in the recognition ratio, the duration of the vowel must be limited to a certain time length. It should be noted that the reference vowel patterns prestored in the first reference pattern memory 28 are prepared in accordance with the rule described above. The speech pattern of a monosyllable "kyō" (i.e., the change in power over time) is shown in FIG. 2. Referring to FIG. 2, reference symbol Q represents the duration of generation of no sound when a speaker pronounces this monosyllable; U, a voiceless duration; and V, a voiced (vowel) duration, respectively. Such duration labeling is performed by the section 24 by, for example, performing acoustic parameter discrimination processing of the speech pattern produced from the segmentation processing section 18. The long vowel component is only considered from a long vowel starting time $t_S$ to an end time $t_E$ after a predetermined constant time length $T_C$ (e g., corresponding to 20 frames) has elapsed. The remaining long vowel component is cut away and is not considered for recognition. The thus truncated long vowel component is used for monosyllable recognition. Since the subsequent recognition procedures for the second monosyllable pattern "kyō" by the sections 24 and 26 are the same as those of the first monosyllable pattern "on", a description thereof will be omitted.

According to the embodiment of the present invention described above, an input speech pattern to be recognized is first roughly matched in accordance with the vowel characteristic and is then finally recognized in accordance with the consonant characteristic. Rough matching can be performed by selecting a duration having a vowel characteristic from the input speech pattern and calculating its similarity with the reference pattern by the pattern matching method. This reduces the amount of calculation required for monosyllable recognition and improves the precision of the results of the rough matching. As a result, excellent monosyllable recognition results can be obtained.

Furthermore, according to the present invention, in categorization of a reference pattern in accordance with the vowel characteristic, a reference monosyllable including a contracted sound and/or syllabic nasal sound is set independently of a reference monosyllable having a vowel, as shown in Table 2. Thus, precision of monosyllable recognition is further improved.

FIG. 4 illustrates a monosyllable recognition apparatus according to another embodiment of the present invention. In FIG. 4, the same reference numerals as shown in FIG. 1 denote the same parts and a detailed description thereof will be omitted. In the operation of this apparatus, it is presupposed that a speaker produces a sound of a vowel sound phoneme V and a sound of a syllabic nasal sound phoneme N clearly. If such a restriction on the side of the speaker is allowed, the number of rough matching categories in accordance with the vowel characteristic to be stored in a first reference pattern memory 50 can be reduced. In the embodiment shown in FIG. 1, as shown in Table 2, the number of vowel categories is 17. However, categorization in accordance with the vowel characteristic in the embodiment shown in FIG. 4 requires a total of only nine categories:

(1) CV: A set of general monosyllables each comprising a combination of a consonant and a vowel, and which is obtained by excluding "YA", "YU" and "YO" from the basic vowels in Table 1. The set comprises five categories corresponding to the vowels "A", "I", "U", "E", and "O".

(2) CYV: A set of contracted sounds each comprising a combination of a consonant, a contracted sound and a vowel, and which is obtained by adding "YA", "YU" and "YO" to the contracted sound group shown in Table 1. The set comprises three categories corresponding to the vowels "A", "U" and "O".

(3) N: A set comprising the single syllabic nasal sound, and which has only one category.

The monosyllables in these nine categories are registered in the first reference pattern memory 50, as shown in Table 3.

TABLE 3

|  |  | Vowel matching category prestored in first memory | | | | | | | |
|---|---|---|---|---|---|---|---|---|---|
|  |  | (1) CV | | | | | (2) CYV | | (3) N |
|  |  | 1 | 2 | 3 | 4 | 5 | 6 | 7 | 8 | 9 |
| Consonant | 1 | A | I | U | E | O | YA | YU | YO | N |
| matching | 2 | KA | KI | KU | KE | KO | KYA | KYU | KYO |  |
| category | 3 | SA | SI | SU | SE | SO | SHA | SHU | SHO |  |
| prestored | 4 | TA | TI | TU | TE | TO | CHA | CHU | CHO |  |
| in second | 5 | NA | NI | NU | NE | NO | NYA | NYU | NYO |  |
| memory | 6 | HA | HI | HU | HE | HO | HYA | HYU | HYO |  |
|  | 7 | MA | MI | MU | ME | MO | MYA | MYU | MYO |  |
|  | 8 | RA | RI | RU | RE | RO | RYA | RYU | RYO |  |
|  | 9 | WA | — | — | — | — | — | — | — |  |
|  | 10 | GA | GI | GU | GE | GO | GYA | GYU | GYO |  |
|  | 11 | ZA | ZI | ZU | ZE | ZO | ZYA | ZYU | ZYO |  |
|  | 12 | DA | DI | DU | DE | DO | DYA | DYU | DYO |  |
|  | 13 | BA | BI | BU | BE | BO | BYA | BYU | BYO |  |

TABLE 3-continued

| | Vowel matching category prestored in first memory | | | | | | | |
|---|---|---|---|---|---|---|---|---|
| | (1) CV | | | | (2) CYV | | | (3) N |
| 1 | 2 | 3 | 4 | 5 | 6 | 7 | 8 | 9 |
| 14 | PA | PI | PU | PE | PO | PYA | PYU | PYO |

In a speech recognition section 52 shown in FIG. 4, in order to allow parallel processing of first pattern matching (rough matching) in accordance with the vowel characteristic at a first matching section 24 and second pattern matching (final identification) in accordance with the consonant characteristic at a second matching section 26, these sections 24 and 26 are connected in parallel with each other. The sections 24 and 26 are further connected to a discriminator 54. The discriminator 54 obtains a final monosyllable recognition result in accordance with data 56 and 58 (matching results in accordance with the vowel and consonant characteristics) which are supplied from the sections 24 and 26, respectively.

In the second embodiment having the configuration as described above, when an input speech pattern is subjected to first pattern matching in accordance with the vowel characteristic at the section 24, it need be compared with only nine reference vowel categories, so that the amount of matching operation processing can be decreased. As a consequence, the time required for monosyllable recognition can be shortened. Furthermore, since first pattern matching in accordance with the vowel characteristic and second pattern matching in accordance with the consonant characteristic are performed by parallel processing, the monosyllable recognition ratio can be improved.

Although the present invention has been shown and described with respect to particular embodiments, various changes and modifications which are obvious to a person skilled in the art to which the invention pertains are deemed to lie within the spirit and scope of the invention.

What is claimed is:

1. An apparatus for recognizing, in units of monosyllables, speech which is produced by a speaker in accordance with a predetermined language system and which is input to said apparatus, comprising:
    (a) first memory means for storing reference vowel patterns which respectively represent first categories of a first number which are, in turn, obtained by classifying a group of known reference monosyllables in accordance with types of vowel characteristic phoneme of the language system, said first categories including independent categories corresponding to a contracted sound and a syllabic nasal sound in addition to categories corresponding to basic vowels;
    (b) second memory means for storing reference consonant patterns of a second number which respectively represent the group of reference monosyllables which are, in turn, classified in accordance with types of consonant characteristic phonemes of the language system;
    (c) first processing means for converting the input speech into electrical signals and for generating acoustic parameter data of the input speech in accordance with the electrical signals;
    (d) second processing means, connected to said first processing means, for performing segmentation for dividing the acoustic parameter data into monosyllabic acoustic parameter components corresponding to monosyllables of the input speech; and
    (e) third processing means, connected to said second processing means and said first and second memory means, for comparing each monosyllabic acoustic parameter component among the monosyllabic acoustic parameter components with the reference vowel and consonant patterns so as to perform monosyllable recognition in accordance with determination of which first category of the reference vowel patterns and which second category of the reference consonant patterns maximally resemble the each monosyllabic acoustic parameter component of the input speech.

2. The apparatus according to claim 1, wherein said third processing means comprises:
    first matching means, connected to said second processing means and said first memory means, for determining that the monosyllabic acoustic parameter component of the input speech, having a vowel characteristic phoneme maximally resembling one reference vowel pattern among the reference vowel patterns stored in said first memory means, belongs to a selected first category among the first categories which includes the one reference vowel pattern and for generating category data representing the selected first category.

3. The apparatus according to claim 2, wherein said third processing means further comprises:
    second matching means, connected to said second processing means, said first matching means and said second memory means, for checking if the monosyllabic acoustic parameter component of the input speech having the vowel characteristic phoneme belonging to the selected first category has a consonant characteristic phoneme which is produced by a speaker prior to the vowel characteristic phoneme and which maximally resembles one reference consonant pattern among the reference consonant patterns stored in said second memory means, and for finally recognizing upon determination of a selected second category to which the each monosyllabic acoustic parameter component also belongs that a monosyllable corresponding to the each monosyllabic acoustic parameter component of the input speech is equal to one reference monosyllable which simultaneously belongs to both the selected first and second categories.

4. The apparatus according to claim 2, wherein when a monosyllable of the input speech has the vowel characteristic of one of the contracted sound and the syllabic nasal sound, that is, excluding the basic vowels, said first matching means determines the selected first category among specific first categories which directly correspond to the contracted sound and the syllabic nasal sound and which are included in the first categories stored in said first memory means.

5. An apparatus for recognizing, in units of monosyllables, speech which is input to said apparatus and which is produced by a speaker in accordance with a predetermined language system having reference monosyllables including combinations of n (where n is a positive integer) vowel characteristic phonemes and m (where m is a positive integer) consonant characteristic phonemes, the reference monosyllable also including a syllabic nasal sound, comprising:

(a) first memory means for storing reference vowel patterns including basic vowel patterns, a contracted sound pattern and a syllabic nasal sound pattern, the reference vowel patterns being commonly included in each of n first groups of reference monosyllables of the predetermined language which are grouped in accordance with all the types of vowel characteristic phonemes consisting of basic vowel phonemes, a contracted sound phoneme and a syllabic nasal sound phoneme;

(b) second memory means for storing reference consonant patterns commonly included in each of m second groups of reference monosyllables of the predetermined language, which are grouped in accordance with all the types of consonant characteristic phonemes;

(c) first processing means for converting the input speech into electrical signals and for generating acoustic parameter data of the input speech in accordance with the electrical signals;

(d) second processing means, connected to said first processing means, for performing segmentation for dividing the acoustic parameter data into monosyllabic acoustic parameter components corresponding to monosyllables of the input speech;

(e) first matching means, connected to said second processing means and said first memory means, for comparing each monosyllabic acoustic parameter component among the monosyllabic acoustic parameter components of the input speech with the reference vowel patterns, and for determining that a monosyllable corresponding to the each monosyllabic acoustic parameter component of the input speech belongs to an i-th group ($i \leq n$) of the first groups and generating first category data corresponding to an i-th reference vowel pattern when the each monosyllabic acoustic parameter component of the input speech has a vowel characteristic phoneme maximally resembling the i-th reference vowel pattern of the reference vowel patterns; and (f) second matching means, connected to said second memory means and said first matching means, for comparing the each monosyllabic acoustic parameter component of the input speech with only consonant characteristic patterns of reference monosyllables included in the i-th group to which the monosyllable of the input speech belongs and which are stored in said second memory means, and for determining that, when the monosyllabic acoustic parameter component of the monosyllable of the input speech has a consonant characteristic phoneme maximally resembling a j-th reference consonant pattern among the reference consonant patterns, the monosyllable of the input speech belonging to the i-th group simultaneously belongs to a j-th ($j \leq m$) group of the second groups, thereby allowing determination of the monosyllable of the input speech as one reference monosyllable belonging to both the i-th group and the j-th group.

6. The apparatus according to claim 5, wherein said first and second memory means respectively store the reference vowel patterns and the reference consonant patterns for reference monosyllables of the Japanese language.

7. The apparatus according to claim 6, wherein said first memory means stores nine first groups of 101 reference monosyllables included in the Japanese language system, the nine first groups including eight monosyllabic groups respectively having reference monosyllables commonly including the five basic vowels "A", "I", "U", "E" and "O", respectively, and reference monosyllables commonly including three contracted sound phonemes, respectively, and one reference monosyllable of a syllabic nasal sound phoneme.

8. The apparatus according to claim 6, wherein said first memory means stores 17 first groups of 101 reference monosyllables included in the Japanese language system, said 17 first groups consisting of reference monosyllables commonly including the five basic vowels "A", "I", "U", "E" and "O", respectively; three contracted sound monosyllables, respectively; one syllabic nasal sound monosyllable; five first complex monosyllables, respectively, each having one of the five basic vowels "A", "I", "U", "E" and "O", and the syllabic nasal sound; and three second complex monosyllables, respectively, each consisting of one of the contracted monosyllables and the syllabic nasal sound.

9. The apparatus according to claim 7, wherein said second memory means stores 13 second groups of 101 reference consonant patterns of the Japanese language system, each of the second groups consisting of reference monosyllables commonly including 13 basic consonant phonemes of "K", "S", "T", "N", "H", "M", "R", "W", "G", "Z", "D", "B" and "P", respectively.

10. The apparatus according to claim 8, wherein said second memory means stores 13 second groups of 101 reference consonant patterns of the Japanese language system, each of the second groups consisting of reference monosyllables commonly including 13 basic consonant phonemes of "K", "S", "T", "N", "H", "M", "R", "W", "G", "Z", "D", "B" and "P", respectively.

11. The apparatus according to claim 6, wherein said second processing means cuts, when the monosyllable of the input speech has a long vowel component longer than a predetermined time period, the vowel pattern representing the long vowel component after the predetermined time period, and omit to perform comparison of a cutoff portion of the vowel pattern of the long vowel pattern with the reference vowel patterns stored in said first memory.

12. A method for recognizing, in units of monosyllables, speech which is produced by a speaker and which is input to a monosyllable recognition apparatus, comprising the steps of:

(a) converting the input speech into corresponding electrical signals and generating acoustic parameter data of the input speech in accordance with the electrical signals;

(b) subjecting the acoustic parameter data to segmentation for division thereof into monosyllable acoustic parameter components respectively corresponding to monosyllables of the input speech;

(c) extracting a vowel characteristic phoneme from each monosyllable acoustic parameter component of the monosyllable acoustic parameter components and for performing first matching between the vowel characteristic phoneme corresponding to the each monosyllabic acoustic parameter component of the input speech and reference vowel phonemes of a predetermined language including basic vowels, a contracted sound phoneme and a syllabic sound phoneme, so as to determine which one of the reference vowel phonemes the vowel characteristic phoneme of the input speech maximally resembles;

(d) extracting a consonant characteristic phoneme from the each monosyllable acoustic parameter component of the input speech, the consonant characteristic phoneme being input prior to the vowel characteristic phoneme in time, and for performing second matching between the consonant characteristic phoneme and reference consonant phonemes of the predetermine language to determine which one of the reference consonant phonemes the consonant characteristic phoneme of the input speech maximally resembles; and (e) after successfully completing the first and second matching, finally recognizing a combined monosyllable of the reference consonant and vowel phonemes which maximally resemble the consonant and vowel characteristic phonemes of the input speech in accordance with results of the first and second matching.

* * * * *